US008050959B1

(12) United States Patent　　(10) Patent No.: US 8,050,959 B1
Erdman et al.　　(45) Date of Patent: Nov. 1, 2011

(54) SYSTEM AND METHOD FOR MODELING CONSORTIUM DATA

(75) Inventors: Donald James Erdman, Raleigh, NC (US); Jacques Rioux, Cary, NC (US); Laura Elizabeth Jackson, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1031 days.

(21) Appl. No.: 11/869,388

(22) Filed: Oct. 9, 2007

(51) Int. Cl.
　　*G06Q 10/00* (2006.01)
(52) U.S. Cl. ........................ 705/7.28; 707/111
(58) Field of Classification Search .................. 707/111
　　See application file for complete search history.

(56) References Cited

U.S. PATENT DOCUMENTS

| | | | |
|---|---|---|---|
| 6,397,224 | B1 | 5/2002 | Zubeldia et al. |
| 6,970,830 | B1 | 11/2005 | Samra et al. |
| 7,039,594 | B1 | 5/2006 | Gersting |
| 7,089,266 | B2 | 8/2006 | Stolte et al. |
| 7,092,929 | B1 | 8/2006 | Dvorak et al. |
| 7,133,876 | B2 | 11/2006 | Roussopoulos et al. |
| 7,305,351 | B1 * | 12/2007 | Bechhofer et al. ............... 705/7 |
| 7,346,538 | B2 | 3/2008 | Reardon |
| 7,370,366 | B2 | 5/2008 | Lacan et al. |
| 2002/0013757 | A1 | 1/2002 | Bykowsky et al. |
| 2002/0046096 | A1 | 4/2002 | Srinivasan et al. |
| 2002/0072953 | A1 | 6/2002 | Michlowitz et al. |
| 2002/0107723 | A1 | 8/2002 | Benjamin et al. |
| 2002/0116237 | A1 | 8/2002 | Cohen et al. |
| 2002/0123930 | A1 | 9/2002 | Boyd et al. |
| 2002/0169654 | A1 | 11/2002 | Santos et al. |
| 2002/0169655 | A1 | 11/2002 | Beyer et al. |
| 2002/0178049 | A1 | 11/2002 | Bye |

(Continued)

FOREIGN PATENT DOCUMENTS

WO　　WO 01/11522　　2/2001

OTHER PUBLICATIONS

Risk Minimizing approach to bit cutting limit determination, Li-Chung Chao, Received Jul. 20, 2006.*

(Continued)

*Primary Examiner* — Lynda Jasmin
*Assistant Examiner* — Luis Santiago
(74) *Attorney, Agent, or Firm* — Jones Day

(57) ABSTRACT

A method is provided for analyzing operational risk associated with one or more organizations, comprising receiving operational loss data from a plurality of organizations at a third-party risk management entity that is a separate entity from the plurality of organizations. The operational loss data includes confidential information regarding one or more of the plurality of organizations. The data received from the plurality of organizations, including the confidential information, is pooled. The pooled data is used to generate an operational risk model for one of the plurality of organizations, and this operational risk model is transmitted to the organization. A system for modeling operational risk for a plurality of organizations is provided, comprising a first data store configured to collect data regarding operational losses from the plurality of organizations, whose data includes confidential information regarding one or more of the organizations. The system includes software instructions configured to pool the operational loss data collected from the plurality of organizations and software instructions configured to generate operational risk models for the organizations using the pooled data, wherein the confidential information is not removed from the pooled data. The system also includes a second data store configured to store the generated models.

21 Claims, 9 Drawing Sheets

U.S. PATENT DOCUMENTS

| | | | |
|---|---|---|---|
| 2003/0023598 | A1 | 1/2003 | Janakiraman et al. |
| 2003/0078830 | A1 | 4/2003 | Wagner et al. |
| 2003/0083924 | A1 | 5/2003 | Lee et al. |
| 2003/0083925 | A1 | 5/2003 | Weaver et al. |
| 2003/0088458 | A1 | 5/2003 | Afeyan et al. |
| 2003/0097292 | A1 | 5/2003 | Chen et al. |
| 2003/0110072 | A1 | 6/2003 | Delurgio et al. |
| 2003/0110080 | A1 | 6/2003 | Tsutani et al. |
| 2003/0120584 | A1 | 6/2003 | Zarefoss et al. |
| 2003/0126010 | A1 | 7/2003 | Barns-Slavin |
| 2003/0208402 | A1 | 11/2003 | Bibelnieks et al. |
| 2003/0208420 | A1 | 11/2003 | Kansal |
| 2003/0236721 | A1 | 12/2003 | Plumer et al. |
| 2004/0093296 | A1 | 5/2004 | Phelan et al. |
| 2004/0111388 | A1 | 6/2004 | Boiscuvier et al. |
| 2004/0199781 | A1 | 10/2004 | Erickson et al. |
| 2005/0033761 | A1 | 2/2005 | Guttman et al. |
| 2005/0066277 | A1 | 3/2005 | Leah et al. |
| 2005/0262108 | A1 | 11/2005 | Gupta |
| 2006/0015416 | A1* | 1/2006 | Hoffman et al. ............... 705/28 |
| 2007/0055482 | A1 | 3/2007 | Goodermote et al. |
| 2007/0174119 | A1 | 7/2007 | Ramsey et al. |
| 2009/0234684 | A1* | 9/2009 | Stoke et al. ...................... 705/7 |
| 2011/0016030 | A1* | 1/2011 | Goodermote et al. .......... 705/34 |

OTHER PUBLICATIONS

Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).

Na, H.S. et al., "Data Scaling for Operational Risk Modelling", ERIM Report Series Research in Management, 24 pp. (Dec. 2005).

Peemoller, Fred A., "Operational Risk Data Pooling", Frankfurt/Main, Deutsche Bank AG, 38 pp. (Feb. 7, 2002).

International Search Report, issued Jun. 22, 2004, for International Application PCT/US03/13394.

De Prisco et al., "On Optimal Binary Search Trees", Information Processing Letters, vol. 45, pp. 249-253 (Apr. 1993).

Pedersen et al., "Multidimensional Database Technology", IEEE, Computer, vol. 34, Issue 12, pp. 40-46 (Dec. 2001).

Model1 by Group 1 Software, www.g1.com, Aug. 29, 1999, pp. 1-16, retrieved from Google.com and archive.org.

SAS Institute, Inc., www.sas.com, Jan. 29, 1998, pp. 1-28, retrieved from Google.com and archive.org.

Hollander, Geoffrey, "Modell deftly parses customer characteristics", InfoWorld, May 25, 1998, vol. 20, No. 21, pp. 1-4, retrieved from Dialog, file 148.

"Unica Releases Model 1 Enterprise Edition", Business Wire, Oct. 29, 1998, pp. 1-3, retrieved from Proquest Direct.

Rosen, Michele, "There's Gold in That There Data", Insurance & Technology, Dec. 1998, vol. 23, No. 12, pp. 1-6, retrieved from Dialog, file 16.

Saarenvirta, Data Mining to Improve Profitability, CMA Magazine, vol. 72, No. 2, Mar. 1998, pp. 8-12.

Johnson et al, Recent Developments and Future Directions in Mathematical Programming, IBM Systems Journal, vol. 31, No. 1, 1992, p. 79-93.

Balintfy et al, Binary and Chain Comparisons with an Experimental Linear Programming Food Price Index, The Review of Economics and Statistics, vol. 52, No. 3, Aug. 1970, pp. 324-330.

Manchanda et al, The "Shopping Basket"; A Model for Multi-Category Purchase Incidence Decisions, Marketing Science, vol. 18, No. 2, 1999, pp. 95-114.

Data Mining News, Looking Past Automation, MarketSwitch Focuses on Optimization of Marketing Campaigns, Data Mining News, May 10, 1999.

Porter-Kuchay, Multidimensional Marketing, Target Marketing, Jan. 2000.

Spiegelman, Optimizers Assist in Specialized marketing Efforts, Computer Reseller News, Nov. 22, 1999.

Horngren, Charles T. et al., "Cost Accounting a Managerial Emphasis", Tenth Edition, Chapter 14, pp. 497-534, 2000.

"Advances in Mathematical Programming and Optimization in the SAS System" by Kearney, SAS Institute, SUGI Proceedings, 1999.

"SAS/OR Optimization Procedures, with Applications to the Oil Industry" by Cohen et al, SAS Institute, SUGI Proceedings, 1994.

"Supply chain design and analysis: models and methods" by Beamon, International Journal of Production Economics, 1998.

"An effective supplier development methodology for enhancing supply chain performance" by Lee et al, ICMIT, 2000.

"Perfect and Open Ratings Form Alliance to Provide Critical Supplier Performance Ratings to Private Exchanges and Net Markets", Business Wire, Oct. 30, 2000.

"12 Technologies: i2 releases i2 five.two-the complete platform for dynamic value chain management; flexible, intuitive, powerful solutions designed to help companies gain efficiencies and drive revenue", M2 Presswire, Oct. 25, 2001.

"Simulation Optimization Using Soft Computing" by Andres Medaglia, PhD dissertation for Operations Research Department at North Carolina State University, Jan. 24, 2001.

"Supplier Selection and Management system Considering Relationships in Supply Chain Management" by Lee et al, IEEE Transactions on Engineering Management, Aug. 2001.

"Solver setting for optimal solutions" by Ananda Samudhram, New Straits Times, Nov. 22, 1999.

"Evaluating Suppliers of Complex Systems: A multiple criteria approach" by Cook et al, The Journal of the Operational Research Society, Nov. 1992.

* cited by examiner

SYSTEM AND METHOD FOR MODELING CONSORTIUM DATA

FIELD

The technology described in this patent document relates generally to a data modeling architecture, which is particularly useful in modeling operational risk for a consortium.

BACKGROUND

Some organizations monitor the likelihood that they will endure losses resulting from risks associated with their operations. Such operational risks may be modeled by the organizations in order to comply with regulatory requirements, to improve capital allocation, for benchmarking, or to improve processes. One issue with such modeling is that an individual organization may not have loss data suitable to produce a very accurate operational risk model.

To overcome the problem of individual organizations' not having suitable loss data, organizations have joined together into consortia, which pool the loss data from their constituent organizations. These consortia typically have combined the loss data from the constituent organizations and whitewashed the data, to remove from the pooled data all information that potentially could identify the source of the loss data. This single set of combined, whitewashed data then was returned to the constituent organizations, which used the returned data sets in their own operational risk modeling processes.

The use of pooled, whitewashed data from a consortium of organizations is not, however, an optimal solution to the problem of organizations' lack of access to suitable loss data. The process of whitewashing the data removes from the data set relevant information that could significantly improve the usefulness of the data set to organizations' operational risk modeling by improving the predictive power of the generated models. Individual organizations, though, are typically more concerned with maintaining the confidentiality of their internal data than with improving the predictive power of their operational risk modeling. Thus, there is a need for a way to produce operational risk models with more predictive power for organizations without compromising the confidentiality of the organizations' data.

SUMMARY

In accordance with the teachings herein, systems and methods are provided for modeling consortium data. A method is provided for analyzing operational risk associated with one or more organizations, comprising receiving operational loss data from a plurality of organizations at a third-party risk management entity that is a separate entity from the plurality of organizations. The operational loss data includes confidential information regarding one or more of the plurality of organizations. The data received from the plurality of organizations, including the confidential information, is pooled. The pooled data is used to generate an operational risk model for one of the plurality of organizations, and this operational risk model is transmitted to the organization. A system for modeling operational risk for a plurality of organizations is provided, comprising a first data store configured to collect data regarding operational losses from the plurality of organizations, whose data includes confidential information regarding one or more of the organizations. The system includes software instructions configured to pool the operational loss data collected from the plurality of organizations and software instructions configured to generate operational risk models for the organizations using the pooled data, wherein the confidential information is not removed from the pooled data. The system also includes a second data store configured to store the generated models.

DETAILED DESCRIPTION

Figure 1:
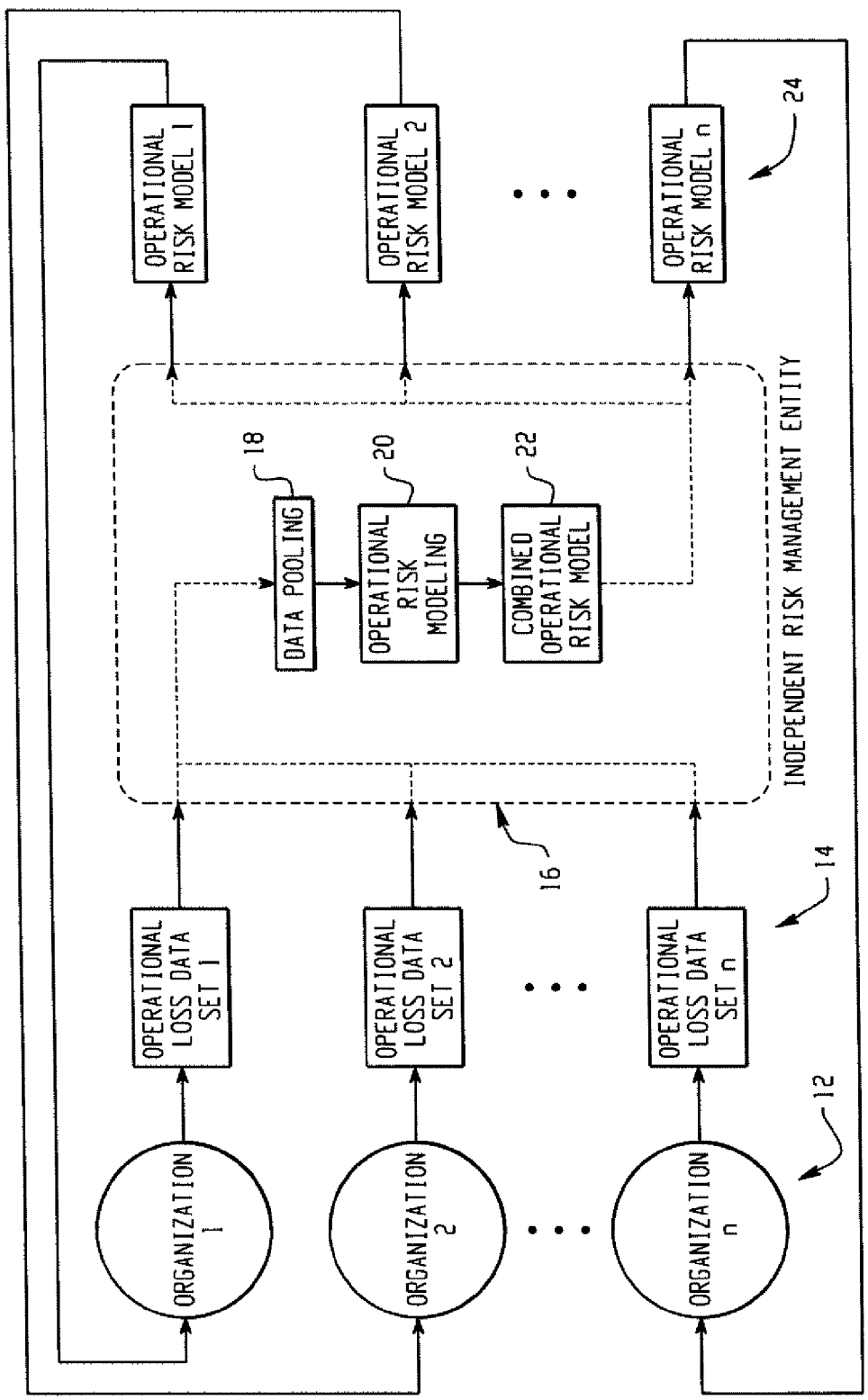
FIG. 1 is a block diagram illustrating an example system and method for modeling consortium data.

FIG. 1 is a block diagram illustrating an example system and method 10 for modeling consortium data. The method 10 includes organizations 12, which produce operational loss data sets 14 based on historical loss events within an organization. A risk management entity 16 that is a separate entity from the organizations 12 receives the operational loss data sets 14 from the organizations 12. In some groups of organizations, the organizations 12 may form a consortium to function as an independent risk management entity 16. The operational loss data sets 14 include confidential data about the organizations 12. For example, the operational loss data sets 14 may include information about internal processes in an organization that the organization does not wish to make public or share with other organizations whose data is received by the risk management entity 16, because such other organizations may be competitors of the organization that wishes to keep its data confidential.

Once the risk management entity 16 receives operational loss data sets 14, the risk management entity 16 pools 18 the received data. This pooling creates a data set containing the combined operational loss data of the organizations. This data set includes confidential information about the organizations 12, which typically would have been removed from the data set before the data set was returned to the organizations that supplied the data. Instead, the data set, including the confidential data, is used for operational risk modeling 20. Since it is based on a broader set of operational loss data, the operational risk modeling 20 is capable of producing models of operational risk that have more predictive power than the models that may be produced by a modeling approach that relies on the operational loss data of a single organization. The operational risk modeling 20 also is capable of producing operational risk models with more predictive power than a modeling approach that relies on data from multiple organizations where the data from multiple organizations has been whitewashed to remove all confidential information about the organizations.

The operational risk modeling 20 may produce a combined operational risk model 22 that models operational risks for the organizations whose data was received by the risk management entity 16. When a combined operational risk model 22 is produced, the combined model is partitioned into operational risk models 24. For example, the combined operational risk model 22 produced may include the summation of several series of values based on a particular variable. A given variable, though, may apply only to modeling the risk of one of the organizations. Thus, when the combined model is partitioned, values based on that variable would be included only in the operational risk model 24 that was transmitted to the one organization to whose models the variable is relevant. In this way, the operational risk models 24 thus produced model both the risk factors shared by the plurality of organizations 12 as well as any risk factors unique to the organization to which that model is transmitted. The operational risk models 24 are transmitted from the risk management entity 16 to the organizations 12, where they may be used in the organizations' 12 internal operational risk modeling processes.

Figure 2:
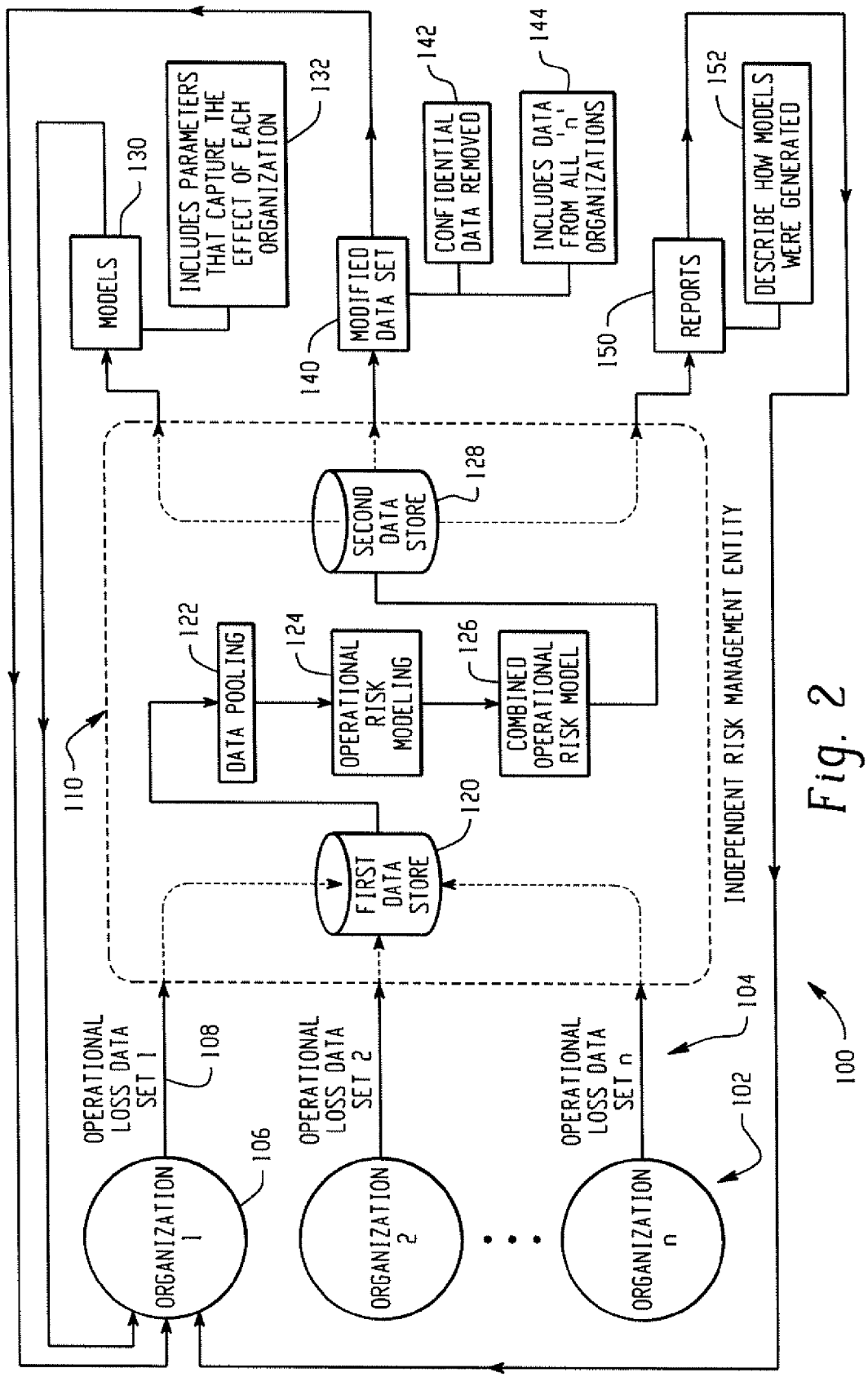
FIG. 2 is a block diagram depicting another example of a system and method for modeling consortium data.

FIG. 2 is a block diagram depicting a more detailed example of a system and method 100 for modeling consortium data. The method 100 includes organizations 102, which produce operational loss data sets 104. An organization 106 collects internal data about operational losses it has experienced historically, which are combined into an operational loss data set 108 that is transmitted by the organization 106 to a risk management entity 110. The risk management entity 110 receives operational loss data sets from the organization 106 and from other organizations 102.

The risk management entity 110 stores the operational loss data sets it receives in a first data store 120. The stored data sets are pooled 122 into a single data set containing the combined operational loss data received from the organizations. This data set is the basis for the operational risk modeling 124 performed by the risk management entity 110. The result of the operational risk modeling 124 performed by the risk management entity 110 is a combined operational risk model 126. This combined model 126 models operational risks to which the organizations whose data was received by the risk management entity 110 are exposed in their operations. The combined operational risk model 126 is stored in a second data store 128. Although the figures depict distinct data stores for the first data store 120 and the second data store 128, other examples may use a single data store to store both the operational loss data received from the organizations and the combined operational risk model 126.

Once it is stored in the second data store 128, the combined operational risk model 126 may be partitioned into separate models 130, each of which may represent one organization's operational risk. Alternatively, the models 130 may represent the operational risk for some subunit of an organization. For example, in a business, each business line operated by the business may have a need for a separate operational risk model that strictly models the risks faced by that business line. As a further example, an organization may differentiate among different categories of operational risk to which the organization or its subunits are exposed. Examples of such categories of operational risk may include external fraud or internal fraud, or the risk of business disruption. A model 130 for one organization that results from partitioning the combined operational risk model 126 includes only the parameters 132 that capture the effect on the model of data that was received by the risk management entity 110 from the organization.

In addition to generating the models 130, the modeling performed by the risk management entity 110 produces other information. For example, the risk management entity 110 may generate a modified data set 140. The modified data set 140 includes the data collected from the organizations 102, 106, modified to remove any data 142 that is confidential to one of the organizations that transmitted the data. The modified data set 140, as returned to the organization 106, does include data from other organizations 102 that transmitted data to the risk management entity 110, not only the data supplied by the organization 106 to which the modified data set 140 is returned. The modeling performed by the risk management entity 110 also may produce reports 150 containing information 152 about how the combined operational risk model 126 was generated.

Once the risk management entity 110 has completed the operational risk modeling 124, the resulting information that pertains to the organization 106, including the models 130, the modified data set 140, and the reports 150, is returned to the organization 106. This information may be used in the internal operational risk modeling processes of the organization 106, which may be implemented using, for example, the SAS OpRisk VaR software application, offered for sale by SAS Institute, Inc. of Cary, N.C.

Figures 3, 4:
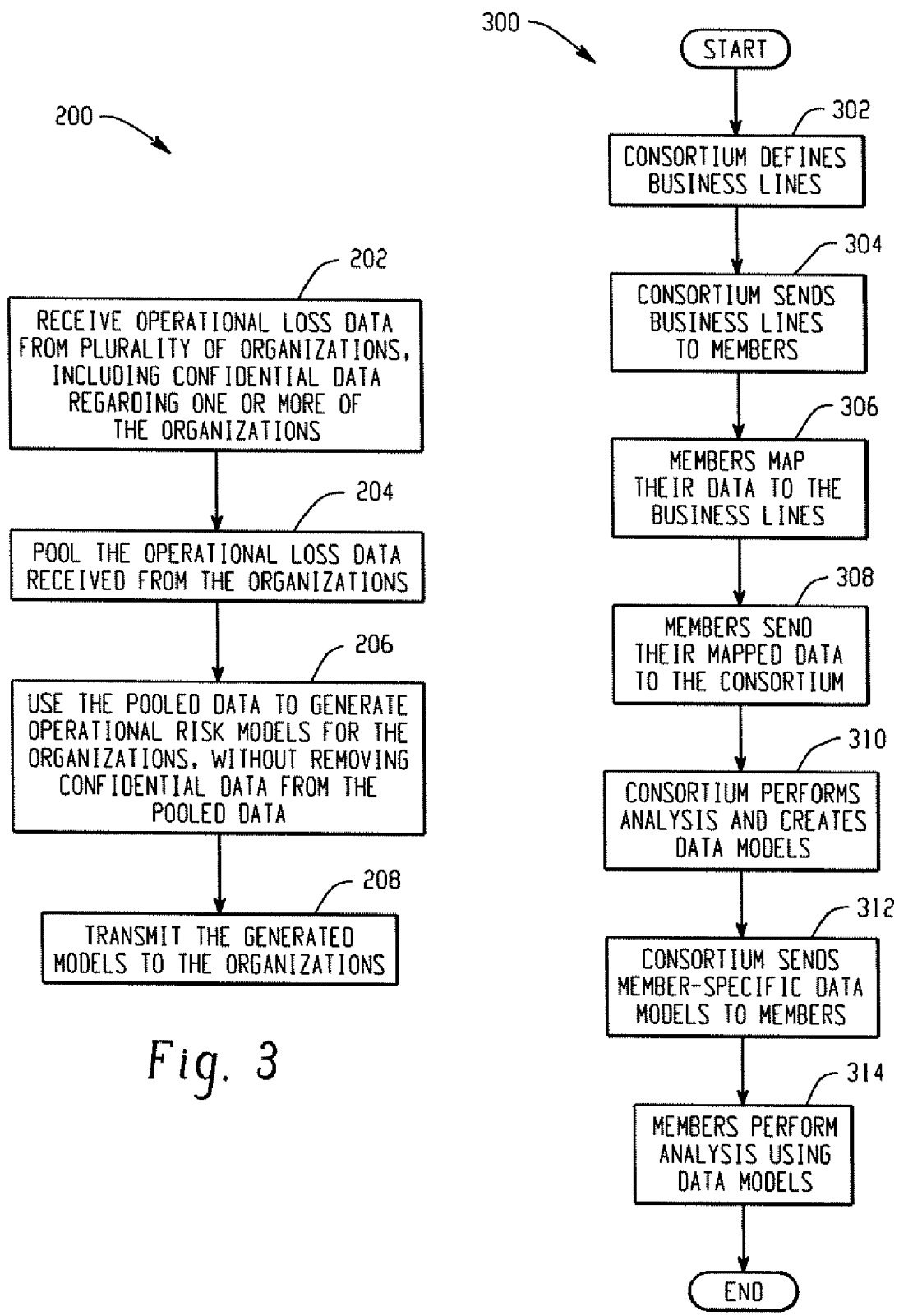
FIG. 3 is a flow diagram depicting an example method for generating operational risk models for a plurality of organizations.
FIG. 4 is a flow diagram depicting an example method for performing operational risk modeling in a group of organizations.

FIG. 3 is a flow diagram depicting an example method 200 for generating operational risk models for a plurality of organizations. In step 202, operational loss data is received from a plurality of organizations. The operational loss data includes confidential data regarding one or more of the organizations. In step 204, the operational loss data received is pooled into a single data set. In step 206, the single data set resulting from the pooling performed in step 204 is used to generate operational risk models for the organizations. The generating of operational risk models in step 206 is done without removing from the single data set the confidential data it contains about one or more of the organizations. The generated models are transmitted to the organizations to which they pertain, as depicted in step 208.

It should be understood that, similar to the other processing flows described herein, one or more of the steps and the order in the flowchart may be altered, deleted, modified and/or augmented and still achieve the desired outcome.

FIG. 4 is a flow diagram depicting an example method 300 for performing operational risk modeling in a group of organizations that have formed a consortium to function as an independent risk management entity. In step 302, the consortium defines business lines along which the operational risk modeling is performed. These business lines are sent by the consortium to its members, as depicted at step 304. Once the members have received the business lines from the consortium, the members map their internal data to those business lines, as shown at step 306. At step 308, the members send to the consortium their internal data, mapped to those business lines defined by the consortium. At step 310, the consortium performs an operational risk analysis upon the data supplied by the members and creates operational risk data models. The consortium sends member-specific operational risk models to the members, as depicted at step 312. The members may perform their own analysis using the data models created by the consortium, as shown at step 314.

Figure 5:
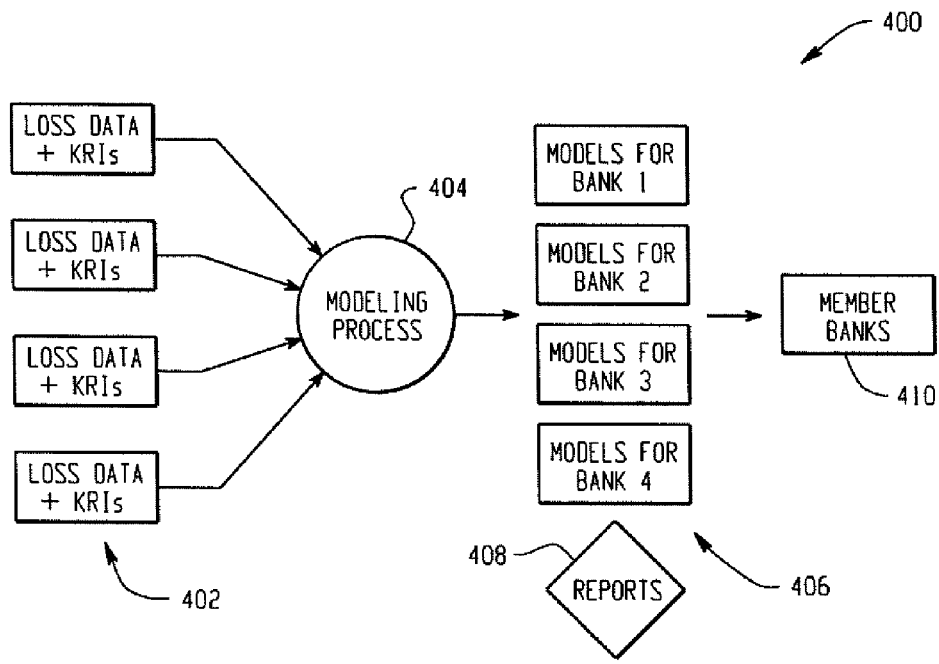
FIG. 5 is a block diagram depicting another example method for creating operational risk models for a group of banks.

FIG. 5 is a block diagram depicting another example method 400 for creating operational risk models for a group of banks. Sets 402 of operational loss data and risk factors sometimes called key risk indicators (KRIs) are sent to the modeling process 404. KRIs are variables associated with loss events. KRIs may describe, for example, some aspect of the state of the bank at the time a loss occurred. Alternately, KRIs may describe some aspect of the state of the world outside the bank at the time a loss occurred. The modeling process 404 uses the operational loss data and the KRIs to generate models 406 for the member banks 410 whose data was used as an input to the consortium modeling process 404. The modeling process 404 also generates reports 408 describing how the models 406 were generated. The generated models 406 and the reports 408 are returned to the member banks 410, where they may be used in the banks' internal operational risk modeling processes.

Figure 6:
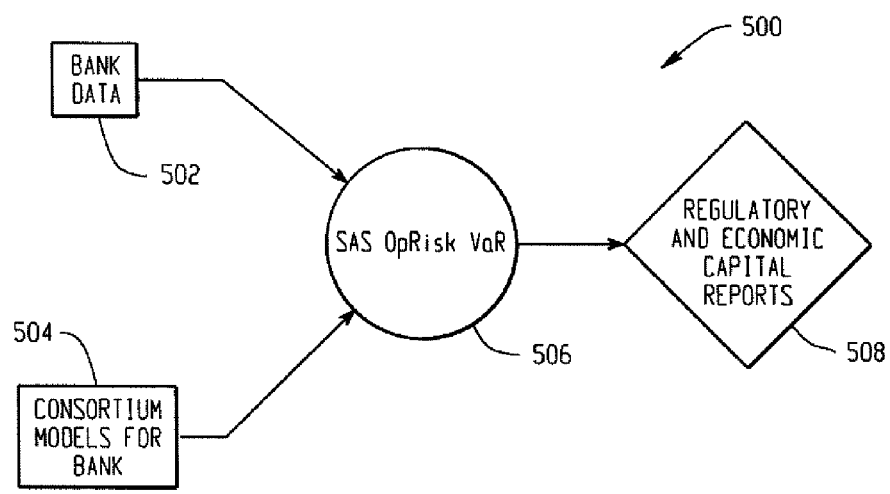
FIG. 6 is a block diagram depicting an example method of using operational risk models generated by a consortium in the internal operational risk modeling of a member bank.

FIG. 6 is a block diagram depicting an example method 500 of using operational risk models generated by a consortium in the internal operational risk modeling of a member bank. The member bank uses its internal data 502 and the operational risk models 504 that were created by the consortium specifically for the bank as inputs to the bank's internal operational risk modeling process 506. An example of a tool that may be used for the bank's internal operational risk modeling process is the SAS OpRisk VaR software application. The bank's internal operational risk modeling process outputs regulatory and economic capital reports 508, which are used by the bank to set the amount it holds in reserve.

The output of the internal operational risk modeling processes at a member bank are the regulatory and economic capital reports 508. Typically, in risk management, a business entity needs to make sure that it has enough available capital in reserve to face rare events that may threaten its survival. Various terms are used to represent this required capital. One of them, economic capital, is essentially the amount of capital a business must hold in reserve to make sure, with a very high probability of success, that it can stay in business. Other such capital requirements are usually tied to industry specific regulations, where each business entity in the industry is required to carry a minimum of capital so that the whole industry can survive. This capital is referred to as regulatory capital. The main challenge in the modeling problem lies in predicting the random number and size of these loss events. The modeling required needs to represent, in probabilistic terms, the number of loss events in a fixed period of time, and the size of those loss amounts. However, the quantity desired by a member bank is the random sum of those random amounts. This is referred to as the aggregate loss amount or simply the aggregate loss. The economic or regulatory capital requirement can then be defined as a high quantile for the distribution of the aggregate loss amount. In other words, the capital required is an amount C such that the probability that the aggregate loss exceeds C is very low.

One example of the type of analysis performed as part of a bank's internal operational risk modeling processes is to compute the annual expected aggregate operational loss for a business line and a fixed risk type. Typically, without the benefit of the modeling provided by the system's predictive modeling technology, the member bank would have a fixed model for the frequency and one for the severity. Suppose that the frequency model has a mean of 5 and the severity model has a mean of $10,000. The aggregate loss mean can then be calculated as the product of the two, or $50,000. With the models 504 received from the consortium, however, a member bank could have a specific model where the average frequency is approximately 5 but also depends, for example, on the turnover rate of its employees. Suppose for simplicity that the severity model stays fixed with the same mean of $10,000. Now the member can forecast the future turnover rate to get a more accurate picture of the future, or the member can put measures in place to control the turnover rate, so that the resulting mean number of losses may now, for example, be 4 instead of 5, thus resulting in an average aggregate loss of $40,000 instead of $50,000.

More complicated analyses can be run using simulation in order to calculate other characteristics of the aggregate loss amount. Regulatory or economic capital can similarly be calculated by simulating the aggregate loss amount. The models 504 received from the consortium contain parameters for the risk factors determined by the consortium to be statistically significant. With the inclusion of these risk factors, it is now possible to measure the effect on the regulatory capital (shown in reports 508) of a policy or a control that would affect those factors. This gives the member banks not only an operational risk measurement tool but an operational risk management tool as well.

Figure 7:
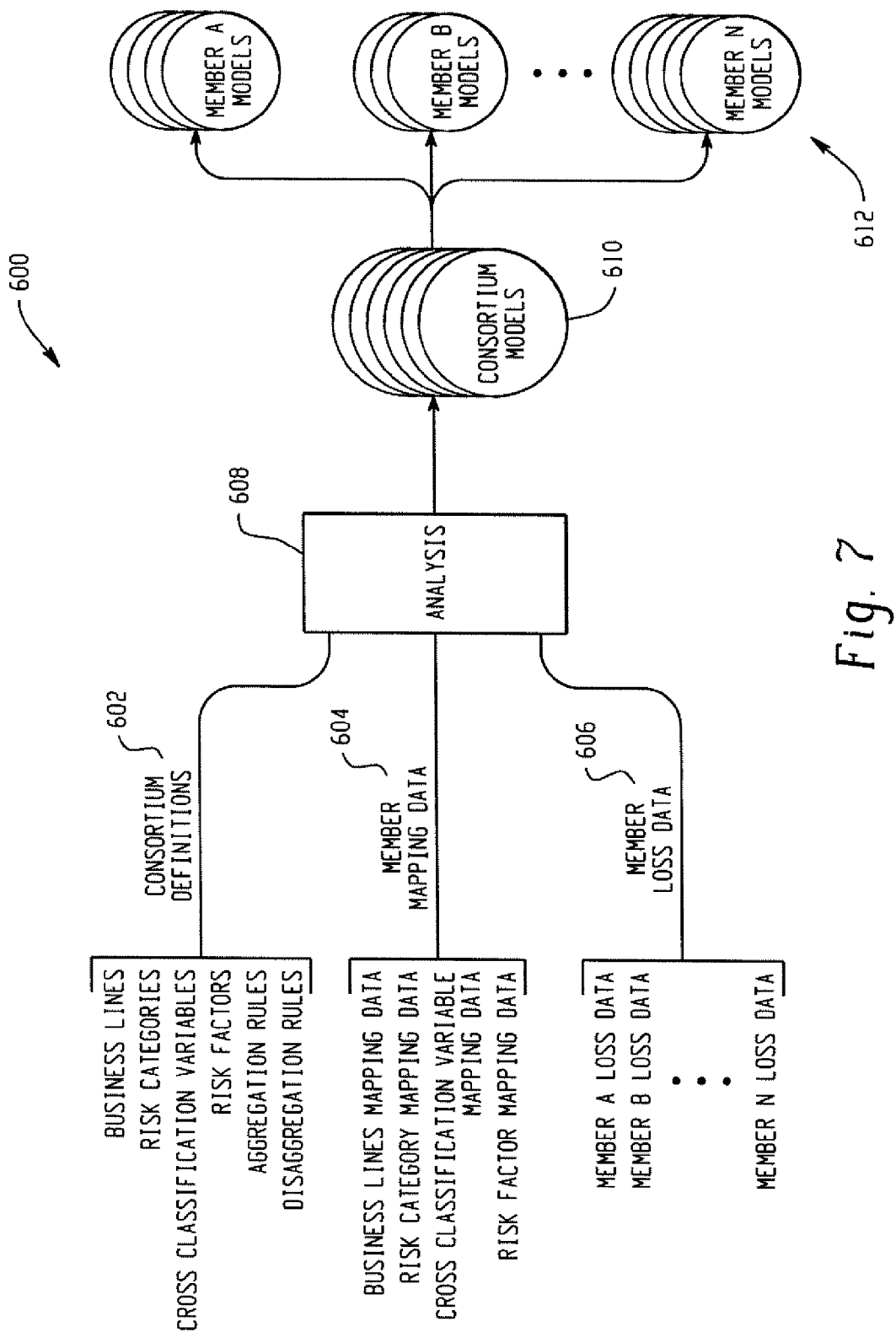
FIG. 7 is a block diagram depicting another example method of modeling operational risk for the members of a consortium.

FIG. 7 is a block diagram depicting another example method 600 of modeling operational risk for the members of a consortium. The consortium definitions 602 of business variables, the member mapping data 604 that maps loss data from the member organizations to the consortium definitions 602, and the member loss data 606 all are inputs to the analysis 608 performed by the consortium.

In a data set, the consortium defines the names, IDs, descriptions and specifications of what the business lines represent. In generating the consortium definitions 602, the standards defined by the Basel Committee on Banking Supervision may serve as a starting point. These standards include, for example, standard definitions of business lines. It is conceivable, though, that some business lines would be merged together while others might be created. This step is required at least once from the consortium. The resulting output is essentially permanent and should be obtainable from the consortium's data store at a moment's request. Other examples of the consortium definitions 602 include business lines, risk categories, other possible cross classification variables, risk factors, aggregation rules, and disaggregation rules. Once the consortium definitions 602 have been created, they are distributed to the member organizations.

Once the consortium definitions 602 have been distributed to the member organizations, member organizations use a mapping tool to map their internal data to the consortium definitions 602. The mapping tool at the member organization completes any needed aggregation or disaggregation of risk factors. As an example, SAS OpRisk VaR 3.3 will implement roll-up rules to automate this process. Once data is received from the member organizations, the system fills in any missing risk factor values, either by analytically "backcasting," by multiple imputations, or, preferably, by prompting the member to fill in missing values using its best knowledge of the past. Potentially, users at the member organization will have executed the step of filling in missing risk factor values before the member organization's data is transmitted to the consortium, so that the system can have these results readily available in the received data.

The member loss data 606 is the internal data from the member organizations regarding loss events that the member organizations have experienced. The member loss data 606 includes confidential information about one or more of the member organizations, which is sent to the consortium for use in analysis 608. After the member mapping data 604 has been generated according to the consortium definitions 602, the loss data 606 and the mapping data 604 are transmitted to the consortium. Ideally, the member organization sends only incremental data. Upon receipt of the data from the member organizations by the consortium, the consortium creates a new data version from the combined data. If incremental data was received, the consortium merely appends the received data to a previous dataset. An indicator variable is added to a loss to identify from which member the loss came. This indicator variable will be used to estimate the inherent differences between members that are not explained by other risk factors.

The consortium uses the data it receives from the member organizations in analysis 608, which produces consortium models 610. The consortium models 610 model operational risks across the member organizations whose loss data 606 and mapping data 604 was received by the consortium. In order to transmit to the member organizations the models that specifically pertain to their organizations, the consortium models 610 are partitioned into groups of one or more models 612 for each member organization. These groups of models 612 will be transmitted to the member organizations so that they may be used in the internal operational risk modeling processes of the member organizations.

The goal of the analysis 608 performed by the consortium is to produce a frequency model, which predicts how often a loss will occur, and a severity model, which predicts how large the predicted loss will be. These predictions are generated on a cell by cell basis, where a cell represents the intersection of a category of operational risk and an organizational subunit of a member organization. Preferably, each such analysis 608 will include a "member specific effect" using the indicator added when the data was loaded. For severity analysis, in its simplest form, the member-specific effect would be a scale effect to a distribution shape that is common to the member organizations. In this form, the scale effect model will contain the following set of parameters.

$$\sum_m \beta_m I_m = \beta_1 I_1 + \beta_2 I_2 + \ldots + \beta_m I_m$$

In this expression, the members are indexed by m, $\beta_m$ represents the scale effect of member m, while $I_m$ is an indicator variable that is equal to 1 for member m, and 0 for the other members. This model thus contains information from the effects on the model of member organizations other than m, but member m will only receive its own member effect $\beta_m$. Similarly, for frequency analysis, the member-specific effect would be multiplicative for the common mean of the members.

As an example, consider three banks (Banks 1, 2 and 3) that are member organizations of a consortium. For a cell defined as the intersection of the business line "Commercial Banking" and the risk type "Damage to Physical Assets," the consortium estimates, based on data from the three banks, that the annual frequency of such losses follows a Poisson distribution with mean equal to $\exp(2.2\times+I_1+3.9\times I_2+1.4\times I_3)$ and the severity of each loss follows a Pareto distribution with shape parameter 3 and scale parameter equal to $\exp(11.2\times I_1+8.9\times I_2+10.4\times I_3)$.

Bank 1 will only receive the following information: the frequency of its losses follows a Poisson distribution with mean $\exp(2.2)=9.025$ and the severity of its losses follows a Pareto distribution with shape parameter 3 and scale parameter equal to $\exp(11.2)=\$73,130.44$. Similarly, Banks 2 and 3 will get their respective frequency and severity scale parameters, along with the commonly known severity shape parameter of 3. Therefore, Bank 2 would know it can expect on average $\exp(3.9)=49.402$ losses per year and Bank 3 exp $(1.4)=4.055$ losses per year. Their severities are Pareto with the common shape parameter 3 together with their respective scale parameter of $\exp(8.9)=\$7,331.97$ (for Bank 2) or $\exp(10.4)=\$32,859.63$ (for Bank 3).

In this example, the only common information being distributed to the members is the severity shape parameter. The effect on the common information of the data submitted to the consortium by each member bank is represented by a constant. Nothing more-specific about the effect on the common model of the bank's data is included. This helps prevent one bank from drawing inferences about what another bank's data might look like.

If the consortium determines that other risk factors have statistical significance, it measures their effects and includes them in the resulting model. Similarly, ad hoc risk factors provided by the members will be included in the model if the consortium determines they are statistically significant. The model above can now be expanded to $$\sum_m \beta_m I_m + \sum_{i=1}^k \beta_i^{All} R_i^{All} + \sum_m \sum_{j=1}^{k(m)} \beta_j^m R_j^m$$

In this expression, there are k common risk factors. The parameters $\beta_1^{All}$ to $\beta_k^{All}$ represent their effects and the $R_i^{All}$'s are the observed values of those risk factors. On the other hand, individual member m has k(m) specific risk factors and their estimated effects are $\beta_1^m$ to $\beta_{k(m)}^m$, while their observed values are the $R_j^m$'s. In this more complex model, individual member m would receive, as before, its own member effect $\beta_m$ plus all the $\beta_i^{All}$'s but only its own $\beta_j^m$'s.

In a further example, suppose that the same three banks are member organizations of the consortium, which in this example requires everyone to supply the amount of annual revenue and the number of employees for each business line. Also suppose that both the number of employees and annual revenue amount have a significant effect on frequency. This example will focus on the frequency analysis in order to simplify the presentation, though the example is equally applicable to the severity analysis.

In this example, annual revenue and the number of employees are examples of variables $R_i^{All}$ in $$\sum_{i=1}^k \beta_i^{All} R_i^{All}.$$

The corresponding factors $\beta_i^{All}$ are estimated by the consortium as $\beta_{revenue}^{All}$ and $\beta_{emps}^{All}$. In this case, the consortium provides each of the three banks not only its own bank-specific frequency scale parameter, but also the parameters specific to "revenue" and "number of employees." These last two parameters are common to the three banks and allow each bank to run "what if" scenarios to see what the predicted effect on the frequency would be of a variation in revenue or number of employees. For Bank 1, the Poisson model for frequency now has a mean of $$\exp(2.2+\beta_{revenue}^{All}\times(\text{Bank1Revenue})+\beta_{emps}^{All}\times(\text{Bank1\#of Employees}))$$

A still further example would build on the same model from the above example, only now suppose that each bank also provided information on some other characteristics of its operations. Bank 1 provided information on employee turnover rate (TOR1) and temporary to permanent employee rate (T2P). Bank 2 provided information on employee turnover rate (TOR2) and risk control assessment score (RCA2). Bank 3 provided information on risk control assessment score (RCA3) only.

The risk factor variables $R_j^m$ in $$\sum_m \sum_{j=1}^{k(m)} \beta_j^m R_j^m$$

are therefore as follows. For Bank 1, $R_1^1$ and $R_2^1$ will be written as $R_{TOR1}^1$ and $R_{T2P}^1$. Similarly, for Bank 2, $R_1^2$ and $R_j^2$ will be written as $R_{TOR2}^2$ and $R_{RCA2}^2$. Finally, $R_1^3$ will represent the only risk factor variable $R_{RCA3}^3$ for Bank 3. Accordingly, in addition to what each member bank would receive from the consortium in the previous example, here Bank 1 also will receive the parameters $\beta_{TOR1}^1$ and $\beta_{T2P}^1$, Bank 2 also will receive $\beta_{TOR2}^2$ and $\beta_{RCA2}^2$, and Bank 3 also will receive $\beta_{RCA3}^3$.

It should be noted that although different banks may supply private information on the same characteristics, they are treated as completely different variables, affecting only the models for the bank that provides the specific information. Those parameters are not distributed freely to all members but are transmitted only to the appropriate member.

In the event that some members did not supply any loss data for a given cell, the models described above may be extended as shown in the following example.

$$\sum_m \beta_m I_m + \sum_{i=1}^k \beta_i^{All} R_i^{All} + \sum_m \sum_{j=1}^{k(m)} \beta_j^m R_j^m + \sum_{BL} \beta_{BL} I_{BL} + \sum_{RT} \beta_{RT} I_{RT}$$

The last two sums of this expression are included to measure the business line (BL) effect and the risk type (RT) effect, respectively. This model limits itself to the case of only a two-dimensional cross classification, however it may be extended to any required dimension. In this example, it is assumed that a member has enough data in each business line and each risk type, but not necessarily in each intersection of the two. This can be seen as a global model that would be fitted to the whole of the data rather than to the cell by cell data.

The information returned to the member organizations in this example would include the same information as in the previous example but would also include the list of the $\beta_{BL}$'s (business line effects) and the $\beta_{RT}$'s (risk type effects). By plugging in the appropriate business line and risk type, a member organization can obtain its own model for each cell.

Figure 8:
FIGS. 8-11 illustrate examples of graphical user interfaces for a system used to model operational risk.

FIGS. 8-11 illustrate example graphical user interfaces for a system of modeling operational risk, which demonstrate how the results of the operational risk modeling performed by the risk management entity may be presented to and used by a user at a member organization. FIG. 8 shows a report of the results of model fitting done for various categories of operational risk and organizational subunits. Examples of categories of operational risk are shown along the horizontal axis. The examples include business disruption and system failure, damage to physical assets, and external fraud. Examples of organizational subunits of a member organization are shown along the vertical axis. FIG. 8 shows examples of the business units of a bank, including corporate finance, insurance, and payment and settlement. The intersection of a category of operational risk with a business unit is referred to as a cell. It is possible for each cell to use a different model of operational risk if the approach leads to more accurate modeling. Also, as shown in the illustrated example, there need not be a model for each cell. In those cells that do have models, the example also demonstrates that various significant aspects of the models for those cells may be displayed through the graphical user interface. These include, for example, the frequency and severity of the estimated losses for the given business line in the given risk category.

Figure 9:
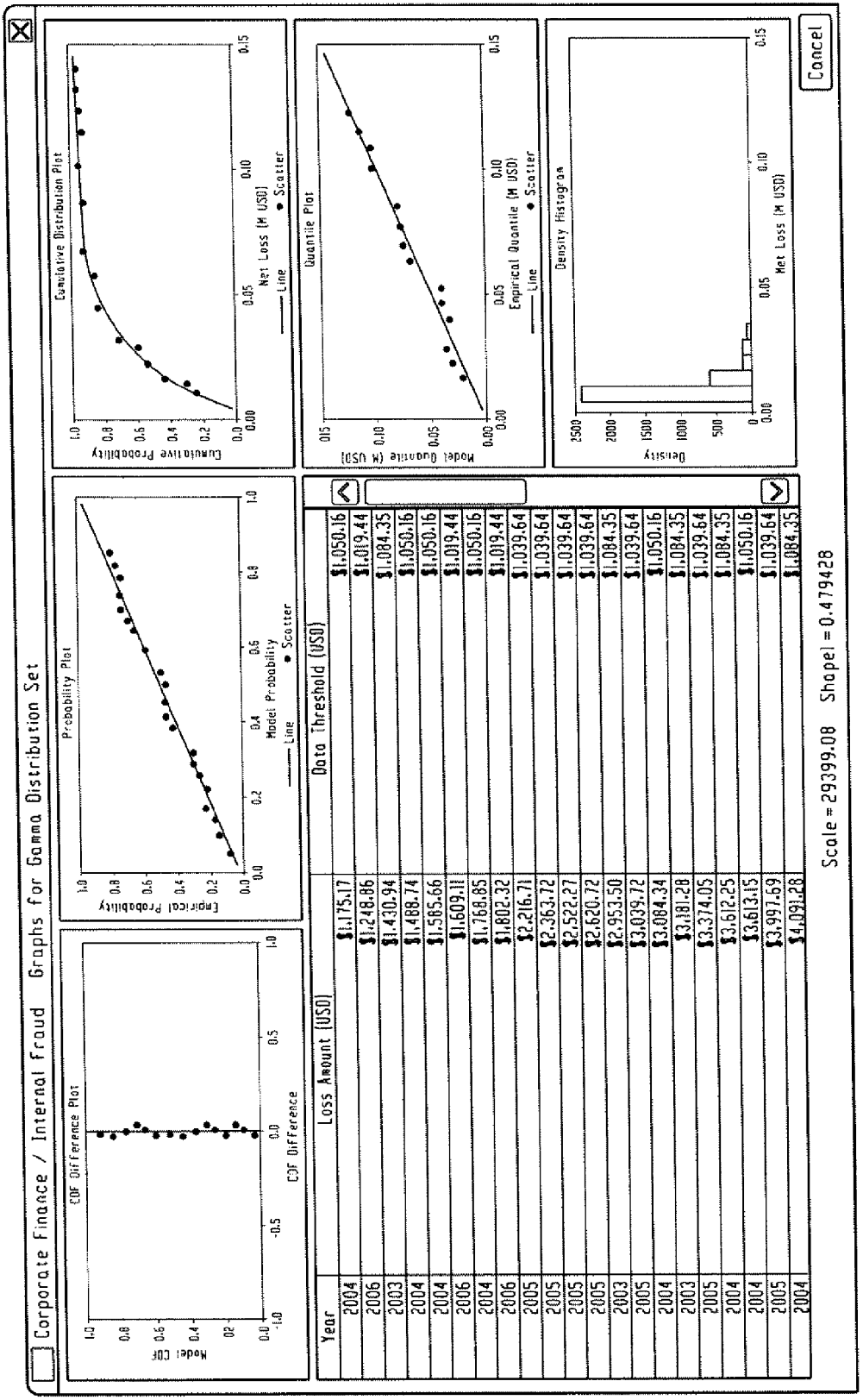

FIG. 9 shows a more detailed report of the results of the operational risk modeling process for a particular cell. In this example, the graphical user interface displays various aspects of the statistical fitting of a model to the severity of a member organization's historical loss data and how well the historical loss data is predicted by the fitted model. This example show another way in which the operational risk models generated by a consortium are integrated into a member organization's internal operational risk modeling processes, as the users of the system at the member organization may use such graphical user interfaces to assess the usefulness and accuracy of the generated models.

Figure 10:
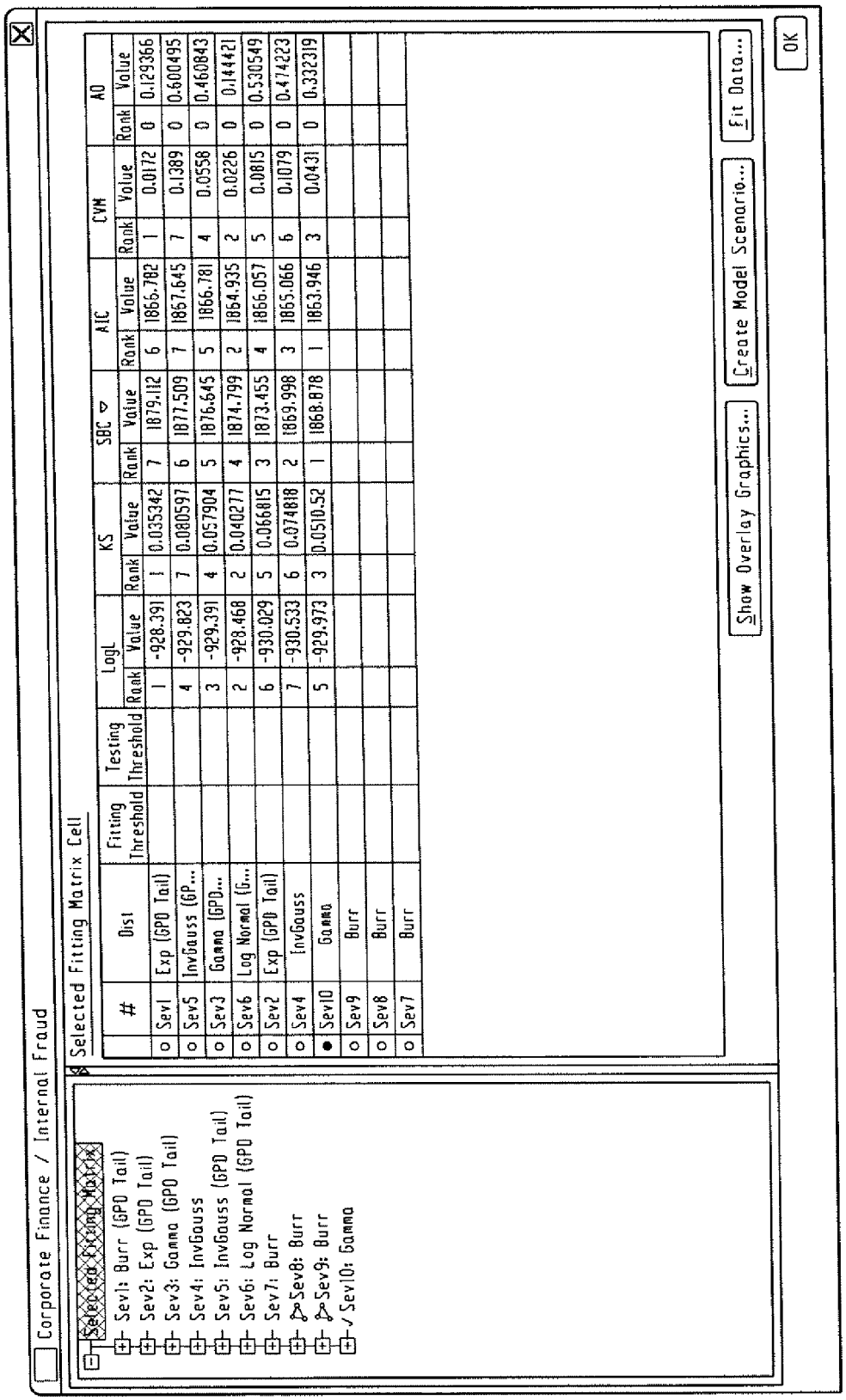

The report depicted in FIG. 10 presents a user with more details about the operational risk modeling process and the results obtained from the risk management entity. In this example, the models that were fitted for one particular cell are shown and the results of the fitting are presented to show how accurately the model that was chosen models the particular cell. In this illustrated example, the cell in question represents the predicted frequency and severity of losses resulting from internal fraud within the corporate finance business unit. Several models other than the chosen model also were fitted to the member organization's loss data, and the example report shows how closely those other models fit the loss data, as well as showing why the chosen model was selected as the best fit for that particular cell.

Figure 11:
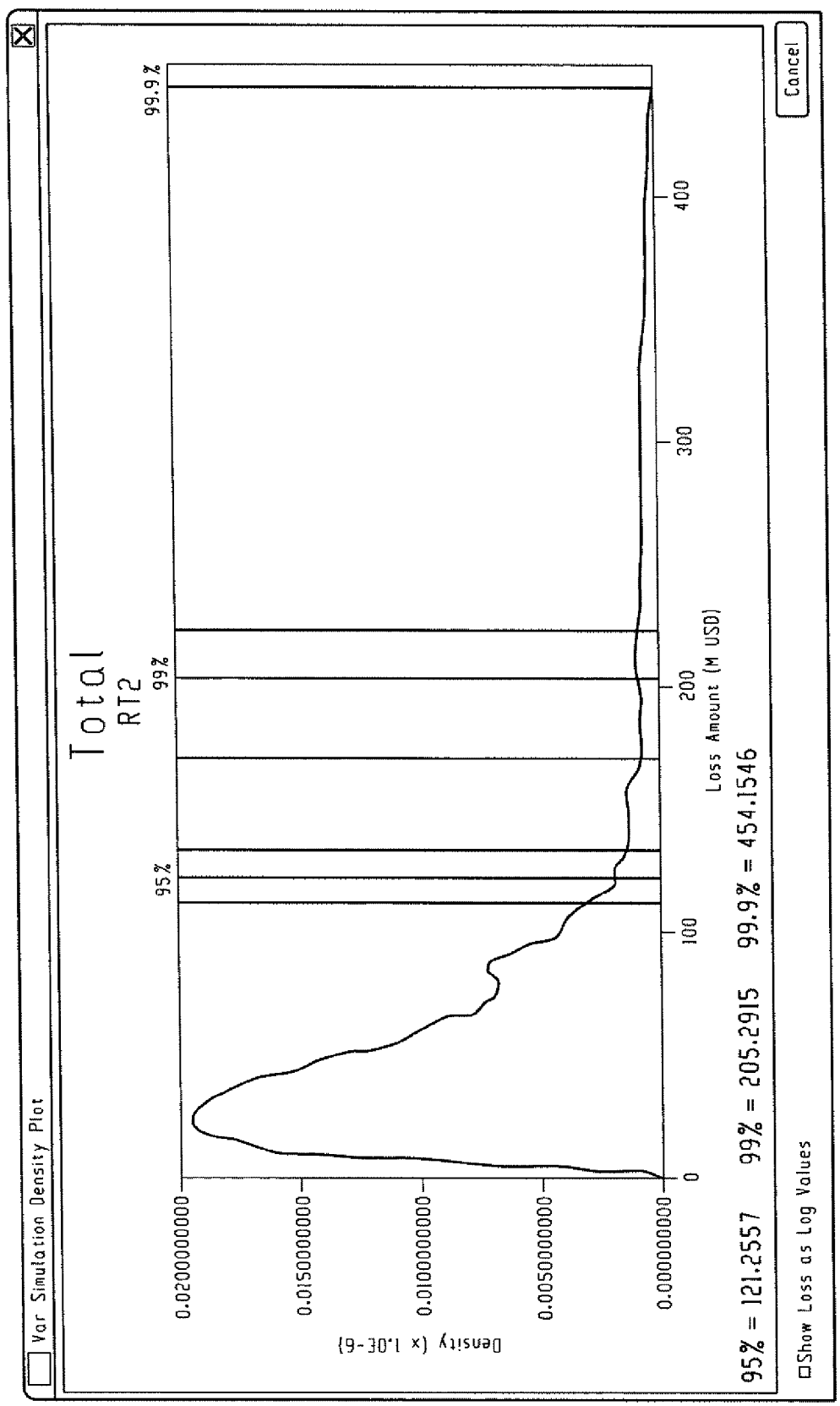

FIG. 11 is another illustration of a report that a user at a member organization may use as part of integrating into the member organization's internal risk modeling the results of the modeling done by the risk management entity. In this illustrated example, the user is presented with information about the capital reserves required to achieve a particular level of certainty that failure will not occur over the modeled time period. Three quantiles are shown, along with the predicted capital reserves. These predictions allow, for example, a member organization to determine what level of risk it is willing to accept. Also, where the member organization is subject to regulations that require the member organization to limit its probability of failure to a given level, this example report presents to the user at the member organization the information needed to conform to those regulatory requirements.

It should be noted that the processes and analyses disclosed herein are not in any way limited to the field of operational loss modeling. These processes and analyses may be applied in other fields that make use of data pooling and modeling. For example, a group of organizations may join together to pool data for the purpose of improving their credit scoring procedures. Also, organizations concerned about fraud, such as, for example, credit card companies, may pool their data to improve fraud detection procedures at each company. Another example is that of organizations, such as insurance companies, joining together to improve each organization's models for predicting the frequency and/or severity of property and casualty damages.

It is claimed:

1. A computer-implemented method for analyzing operational risk associated with one or more organizations, comprising:

receiving operational loss data from a plurality of organizations based on historical loss events, which includes confidential information regarding one or more of the plurality of organizations, wherein the operational loss data is received by a third-party risk management entity that is a separate entity from the plurality of organizations;

pooling the data received from the plurality of organizations, including the confidential information;

generating one or more operational risk models for one of the plurality of organizations using the pooled data, wherein the confidential information is not removed from the pooled data, wherein the one or more operational risk models includes an effect model that is specific to the one of the plurality of organizations, the effect model including at least one of a scale effect to a distribution shape that is common to the plurality of organizations and a frequency effect that scales a common mean of the plurality of organizations; and transmitting the one or more operational risk models to the one organization;

wherein the steps of the method are performed by one or more processors;

wherein the scale effect is a model that includes the following parameters:

$$\sum_m \beta_m I_m = \beta_1 I_1 + \beta_2 I_2 + \ldots + \beta_m I_m$$

wherein the plurality of organizations are indexed by m, βm represents the scale effect of organization m, and Im is an indicator variable that is equal to 1 for organization m and is equal to 0 for other ones of the plurality of organizations; and wherein the frequency effect is a model that includes the following parameters:

$$\sum_m \alpha_m I_m = \alpha_1 I_1 + \alpha_2 I_2 + \ldots + \alpha_m I_m$$

wherein the plurality of organizations are indexed by m, $\alpha_m$ represents the scale of the common mean, and Im is an indicator variable that is equal to 1 for organization m and is equal to 0 for other ones of the plurality of organizations.

2. The method of claim 1, wherein a combined operational risk model is generated, the combined operational risk model comprising:

common model elements that are common to all of the organizations whose operational loss data was used to create the model; and organizational model elements that are specific to each of the organizations whose operational loss data was used to create the model;

wherein the organizational model elements corresponding to an organization and the common model elements are transmitted to the organization.

3. The method of claim 1, wherein the generated operational risk model transmitted to the one organization does not contain information that could be used to ascertain the confidential information of another organization in the plurality of organizations.

4. The method of claim 1, wherein operational risk models are generated for more than one of the plurality of organizations.

5. The method of claim 1, wherein a modified data set is created from the pooled data by removing the confidential information.

6. The method of claim 5, wherein the modified data set is transmitted to the one organization along with the one or more generated models.

7. The method of claim 1, wherein each generated model includes a constant to represent the effect on the model of the operational loss data for each organization of the plurality of organizations whose data was included in the pooled data.

8. The method of claim 1, wherein information about how the models were constructed is transmitted to the one organization along with the one or more generated models.

9. The method of claim 1, wherein information regarding the state of the organization's operations at the time of an operational loss is received along with the operational loss data.

10. The method of claim 9, wherein the information regarding the state of the organization's operations at the time of an operational loss is used to generate operational risk models for the plurality of organizations.

11. The method of claim 1, wherein operational risk models are generated for a plurality of groups that represent business lines of the organization.

12. The method of claim 1, wherein operational risk models are generated for a plurality of categories of operational risk.

13. The method of claim 1, wherein the organizations are for-profit business entities.

14. The method of claim 13, wherein the business entities are financial institutions.

15. A method for making a risk management decision for an organization using a data model generated by a risk management entity that is a separate entity from the organization, comprising:

collecting operational loss data for the organization based on historical loss events, which includes confidential information regarding the organization;

transmitting the collected operational loss data to the independent risk management entity; and receiving from the independent risk management entity a data model generated based in whole or in part on the operational loss data for the organization as well as operational loss data, including confidential information, for one or more other organizations; wherein the confidential information regarding the organization and the one or more other organizations is not removed prior to generating the data model, wherein the data model includes an effect model that is specific to the organization, the effect model including at least one of a scale effect to a distribution shape that is common to both the organization and the one or more other organizations and a frequency effect that is scales a common mean of the organization and the one or more other organizations;

wherein the steps of the method are performed by one or more processors;

wherein the scale effect is a model that includes the following parameters:

$$\sum_m \beta_m I_m = \beta_1 I_1 + \beta_2 I_2 + \ldots + \beta_m I_m$$

wherein the organization and the one or more other organizations are indexed by m, $\beta m$ represents the scale effect of organization m, and Im is an indicator variable that is equal to 1 for organization m and is equal to 0 for other organizations; and wherein the frequency effect is a model that includes the following parameters:

$$\sum_m \alpha_m I_m = \alpha_1 I_1 + \alpha_2 I_2 + \ldots + \alpha_m I_m$$

wherein the plurality of organizations are indexed by m, $\alpha_m$ represents the scale of the common mean, and Im is an indicator variable that is equal to 1 for organization m and is equal to 0 for other ones of the plurality of organizations.

16. The method of claim 15, wherein the data model received from the independent entity is incorporated into the existing operational risk modeling process of the organization.

17. A system for modeling operational risk for a plurality of organizations, said system comprising:
  a first data store configured to collect data regarding operational losses from the plurality of organizations based on historical loss events, which includes confidential information regarding one or more of the organizations;
  software instructions configured to pool the operational loss data collected from the plurality of organizations;
  software instructions configured to generate operational risk models for the organizations using the pooled data, wherein the confidential information is not removed from the pooled data, wherein the operational risk models include an effect model that is specific to one of the plurality of organizations, the effect model including at least one of a scale effect to a distribution shape that is common to the plurality of organizations and a frequency effect that scales a common mean of the plurality of organizations;
  a second data store configured to store the generated models;
  wherein the scale effect is a model that includes the following parameters:

$$\sum_m \beta_m I_m = \beta_1 I_1 + \beta_2 I_2 + \ldots + \beta_m I_m$$

wherein the plurality of organizations are indexed by m, $\beta m$ represents the scale effect of organization m, and Im is an indicator variable that is equal to 1 for organization m and is equal to 0 for other ones of the plurality of organizations; and wherein the frequency effect is a model that includes the following parameters:

$$\sum_m \alpha_m I_m = \alpha_1 I_1 + \alpha_2 I_2 + \ldots + \alpha_m I_m$$

wherein the plurality of organizations are indexed by m, $\alpha_m$ represents the scale of the common mean, and Im is an indicator variable that is equal to 1 for organization m and is equal to 0 for other ones of the plurality of organizations.

18. The system of claim 17, wherein the first and second data stores are included in the same data storage medium.

19. The system of claim 17, including software instructions configured to transmit the generated models to the organizations.

20. A system for communicating with a risk management entity that is a separate entity from a plurality of organizations includes a system for modeling operational risk that is configured to collect and pool operational loss data for the plurality of organizations, including confidential information regarding one or more of the organizations, and generate operational risk models using the pooled data, said system comprising:
  a first data store configured to collect operational loss data for an organization based on historical loss events, which includes confidential information regarding the organization;
  software instructions configured to transmit the collected operational loss data to the independent risk management entity; and
  a second data store configured to receive operational risk models from the risk management entity, wherein the operational risk models were generated based in whole or in part on the operational loss data for the organization as well as operational loss data, including confidential information, for one or more other organizations, wherein the confidential information regarding the organization and the one or more other organizations is not removed prior to generating the operational risk models, wherein the operational risk models include an effect model that is specific to the organization, the effect model including at least one of a scale effect to a distribution shape that is common to both the organization and the one or more other organizations and a frequency effect that scales a common mean of the organization and the one or more other organizations;
  wherein the scale effect is a model that includes the following parameters:

$$\sum_m \beta_m I_m = \beta_1 I_1 + \beta_2 I_2 + \ldots + \beta_m I_m$$

wherein the organization and the one or more other organizations are indexed by m, $\beta m$ represents the scale effect of organization m, and Im is an indicator variable that is equal to 1 for organization m and is equal to 0 for other organizations; and wherein the frequency effect is a model that includes the following parameters:

$$\sum_m \alpha_m I_m = \alpha_1 I_1 + \alpha_2 I_2 + \ldots + \alpha_m I_m$$

wherein the plurality of organizations are indexed by m, $\alpha_m$ represents the scale of the common mean, and Im is an indicator variable that is equal to 1 for organization m and is equal to 0 for other ones of the plurality of organizations.

21. The system of claim 20, wherein the first and second data stores are included in the same data storage medium.

* * * * *